Oct. 19, 1926.

E. C. STEERE 1,603,425

ELECTRIC WATER HEATER

Original Filed April 24, 1925

Inventor
Ernest Charles Steere
By B. Singer, Atty.

Patented Oct. 19, 1926.

1,603,425

UNITED STATES PATENT OFFICE.

ERNEST CHARLES STEERE, OF SYDNEY, NEW SOUTH WALES, AUSTRALIA.

ELECTRIC WATER HEATER.

Application filed April 24, 1925, Serial No. 25,636, and in Australia May 9, 1924. Renewed June 18, 1926.

This invention relates to water heaters provided with a lid and of the type in which the water is heated by an immersed heating element, and has been devised to prevent accidental interference with the heating element while it is in live condition.

The lid is adapted to be locked in closed position by the act of attaching the connecting plug to the contact points of the heating element and is retained in that position as long as the plug remains on the points.

In a practical application of the invention an extended tail piece is formed on the lid of a hot water jug and is pivotally mounted between lugs formed on the jug. Contact points, connected with the heating element which is suspended by any suitable means within the vessel, are brought out under the tail piece in such a position that when the lid is closed the act of attachment of the plug locks the lid on the jug. The pivotal mounting of the lugs is of a permanent non-detachable character so that the lid cannot be removed or its position altered while the plug remains on the points.

The lower face of the lid is provided with a downwardly projecting lip to restrict the flow of water from the jug and to prevent lateral movement of the lid.

In the drawings:—

Figure 1:
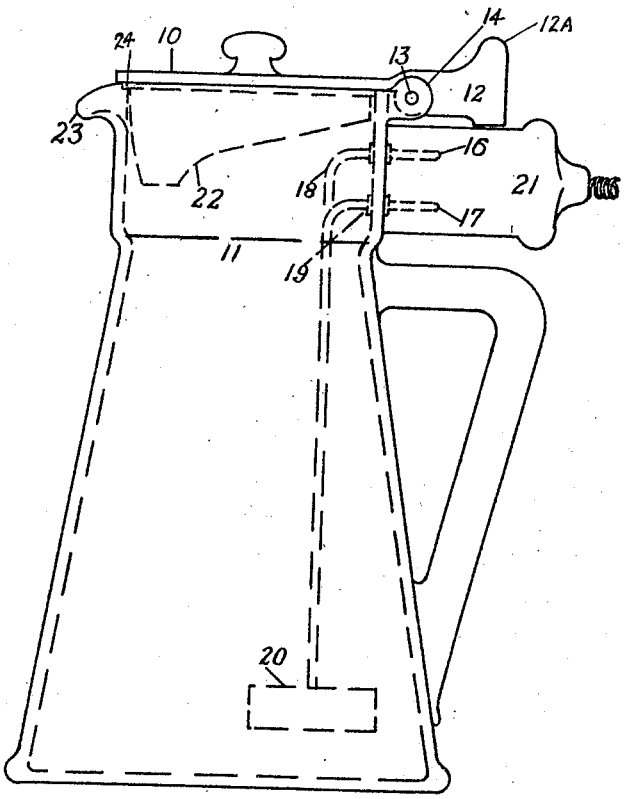
Figure 1 is a sectional elevation of the invention as applied to a hot water jug.
Figure 2:
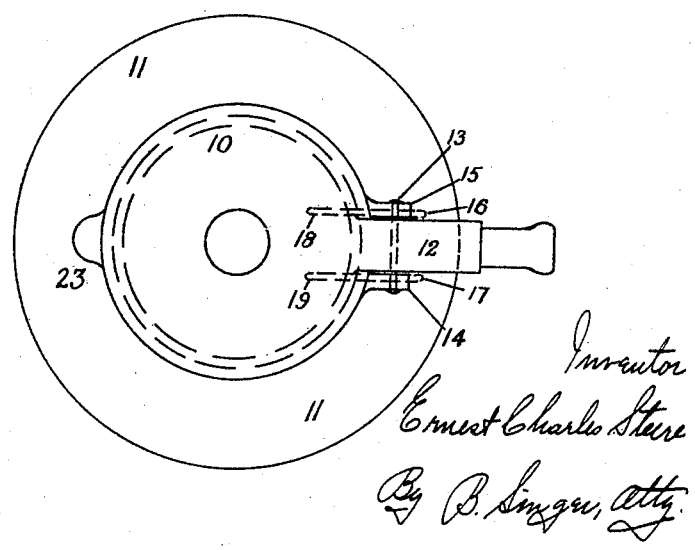
Figure 2 is a plan with the plug removed.

The lid 10 of the jug 11 is formed with an extended tail piece 12 which is pivoted on a permanently mounted hinge pin 13 carried by hinge lugs 14, 15. An upstanding portion 12^A facilitates pivotal movement of the lid.

Contact points 16, 17, connected with leads 18, 19 of a heating element 20, are inserted under and to either side of the tail piece in order that the tail piece may be swung to a vertical position when the plug is removed.

When the plug is mounted on the points the lid is locked in closed position. The plug must be removed and the electrical connection of the element 20 with the supply circuit thereby broken before the lid can be raised.

A downwardly projecting lip 22, fitted with a rubber band 24 which acts as a shock absorber, restricts the flow of water from the spout 23 and prevents lateral movement of the lid.

I claim:—

1. An electric water heater comprising a water container, a lid pivotally mounted on said container and having a tail piece projecting from one side of the container, contact points projecting from the same side of the container and arranged near said tail piece and a connecting plug arranged for engagement with said contact points and to bear under said tail piece when so arranged, to prevent opening of the lid while the current is on.

2. An electric water heater comprising a water container, a lid for the container, an extended tail piece on the lid, hinge lugs on the container, a permanently mounted hinge pin passing through said tail piece and lugs, contact points mounted on the container below the lugs and to one side of the tail piece, a connecting plug mountable on the contact points below the tail piece and contacting therewith, and a suspended heating element connected with said contact points within the container.

In testimony whereof he has signed his name to this specification.

ERNEST CHARLES STEERE.